Dec. 11, 1923.
J. B. ANDERSON
VALVE
Filed March 30, 1921
1,477,023
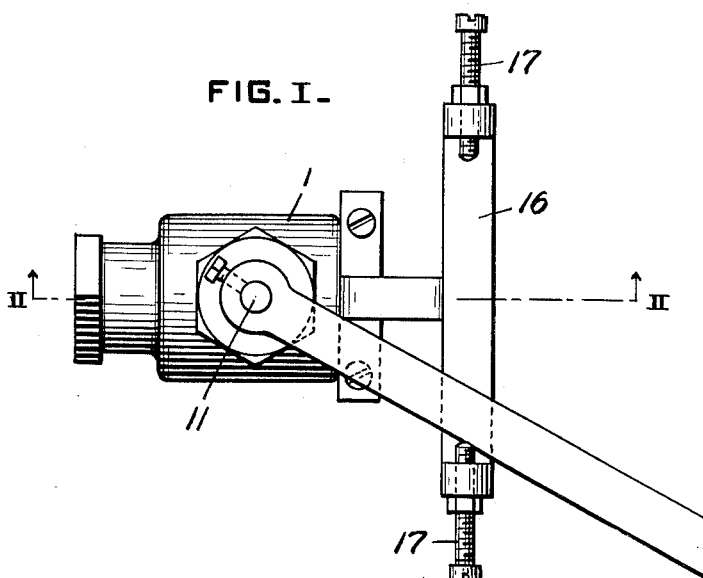
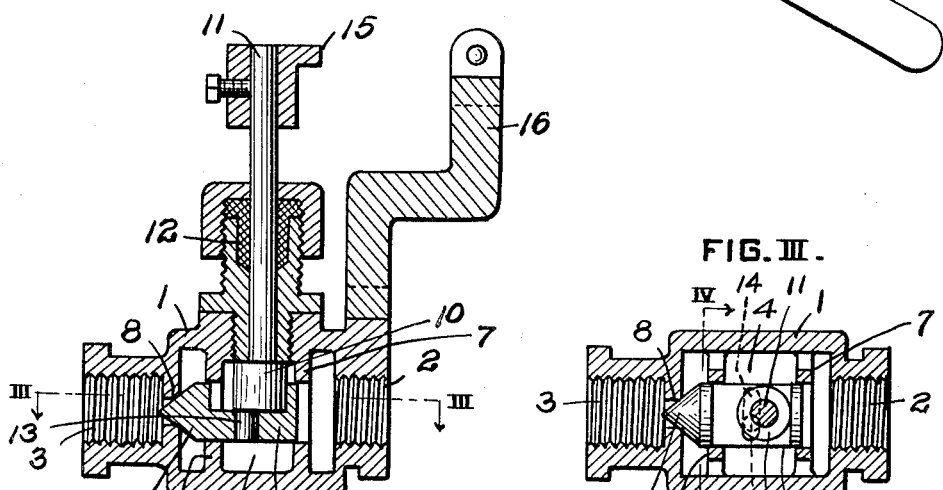
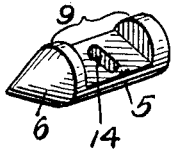
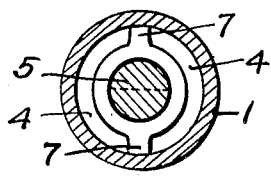
WITNESSES
J. Herbert Bradley
Francis J. Tomasson
INVENTOR
James B. Anderson
by Christy and Christy
his attorneys Patented Dec. 11, 1923.

1,477,023

UNITED STATES PATENT OFFICE.

JAMES B. ANDERSON, OF SHALER TOWNSHIP, ALLEGHENY COUNTY, PENNSYLVANIA, ASSIGNOR TO THE PEOPLES NATURAL GAS COMPANY, OF PITTSBURGH, PENNSYLVANIA, A CORPORATION OF PENNSYLVANIA.

VALVE.

Application filed March 30, 1921. Serial No. 456,798.

*To all whom it may concern:*

Be it known that I, JAMES B. ANDERSON, residing in Shaler Township, in the county of Allegheny and State of Pennsylvania, a citizen of the United States, have invented or discovered certain new and useful Improvements in Valves, of which improvements the following is a specification.

My invention relates to improvements in valves, and is applicable to the control of the flow of fluid in a conductor. I have developed it for the control of liquid fuel to the burner of a domestic heater, and I shall describe it in such application. The advantages of the invention are realized in a valve which is durable, and a valve whose range of opening may be confined within limits preliminarily established, to protect the valve from injury, and further in a valve whose range of opening may be additionally confined and limited when installed, to adapt it to the particular conditions of individual installation. The benefit and advantage of such additional control is realized in saving of waste of fuel and prevention of heating effect beyond what is desired.

In the accompanying drawings Fig. I is a view in elevation of a valve embodying my invention; Fig. II is a view in vertical section, on the plane indicated by the line II—II, Fig. I; Fig. III is a view in section on the plane indicated at III—III, Fig. II. In this figure the valve itself is shown in elevation and the valve-operating stem is shown in section. This showing of the valve stem is irregular, in that the plane of section does not pass through the smaller part of the valve stem, but the relative position of the stem is here indicated in this manner to afford clearer understanding of the method of operation. Fig. IV is a view in section, on the plane indicated at IV—IV, Fig. III; and Fig. V is a view in perspective of the valve detached.

The valve casing is indicated at 1; it is chambered within, as will presently be remarked again; and it is provided with inlet and outlet ports, screw-threaded, to the end that the mechanism may be assembled in the line of flow of fuel to a burner. The screw-threaded inlet and outlet ports 2 and 3 are conveniently formed in opposite walls of the casing and axially aligned, as will clearly appear on comparing Figs. II and III.

Between inlet and outlet and in communication with them is the valve chamber 4. The valve as here shown is of conical type, which is the type preferred; it consists of a shank or body 5 (preferably cylindrical) terminating in a conical end 6, which is the valve proper. This cylindrical body 5 is borne for longitudinal reciprocation in axial alignment with ports 2 and 3 by bridge members 7 spanning the valve chamber. These bridge members which span the valve chamber and which constitute bearings within which the valve may slide, do not constitute partitions, to cut off flow through the chamber; but, as will clearly be perceived on examining Fig. IV, they are so shaped that passageways lead around them and between them and the inner walls of the valve chamber, of sufficient width to assure unhindered flow through the chamber. It is not necessary that the bridge members 7 engage the valve closely; there may be play of as much as a thirty-second of an inch.

The valve preferably, though not necessarily, closes in the direction of flow (it might close against the flow) and accordingly, it is borne axially, to and from engagement with a seat consisting in a circular orifice opening from chamber 4 to the outlet 3. This orifice is formed in a partition 8, otherwise separating chamber 4 from the outlet.

The valve body is slotted longitudinally—preferably it is cut away on one side to substantially half its thickness—and throughout a sufficient portion of its length to form a recess 9, see Fig. V. This recess is semi-cylindrical in shape and is limited at opposite ends by solid walls of the valve body itself. Into this recess 9, when the parts are assembled, projects the end of a stem 11, preferably enlarged into a drum 10. This stem 11 extends through the wall of chamber 4 in a direction at right angles to the direction of movement of the valve. It is rotary, and to that end a stuffing box 12 is provided, introduced into the wall of chamber 4, and through this stuffing box the stem 11 extends. The drum 10 is connected with the body of valve 5 by an eccentric pin-and-slot connection; in this instance the pin 13 eccentrically placed protrudes from the head of drum 10 and into a transversely extending slot 14 formed in the body 5 of the valve. As stem 11 is rotated, the valve is by the connections described shifted to and fro, relatively to its seat.

The length of the recess 9, the diameter of drum 10, and the degree of eccentricity of pin 13 may be so correlated that in one or in both directions the range of the shift of the valve will be limited by engagement of the end wall of recess 9 in valve 5 with the external cylindrical surface of drum 10. Furthermore, the valve seat may be so placed and the proportions of the valve may be such with relation to the parts last mentioned, that, as the valve comes to its seat, the abutment of drum 10 against the limiting wall of recess 9 will check its further advance.

Ordinarily, in the use of cone valves, the repeated jamming of the valve down upon its seat gradually deforms it, leakage follows, regrinding becomes necessary, and in time the valve is ruined, and the valve seat too. In the use of my invention, when making installation, it is sufficient, when the valve is first brought to its seat, to tap the valve, and by so doing to shape minutely the seat to the valve. Thereafter continued use will not bring about rapid wearing-out, of such nature as I have indicated.

Stem 11 may be rotated to open and close the valve, by means of such a familiar lever arm as 15, extending crank-like from the stem. This lever 15 swings in the interval between the arms of a stirrup 16, and in these arms are mounted adjustable screws 17, against the ends of which lever 15 makes abutment as it comes to the ends of its range of swing. By means of these screws the effective range of the valve may be further reduced and controlled, and this adjustable control has value, over and above the control afforded by the abutment of head 10 upon the ends of recess 9, already described. That control last mentioned, once adjusted, remains imposed upon the valve, from the time it leaves the shop. The supplemental control, to which I now direct particular attention, is imposed at the time of installation, and once imposed may be altered, to meet new necessities.

By proper setting of the screw 17 which limits closing movement of the valve, a certain minimum flow may be insured, sufficient for example to keep a pilot light burning or perhaps to nourish a small freezing-preventing flame. By proper setting of the opposite screw 17, the maximum amount of fuel deliverable may be limited, so as to prevent—perhaps an excess of heating effect, perhaps a wasteful and ineffective glutting of the burner.

I have described the invention in its application to the supply pipe of a liquid-fuel burner. Manifestly it is applicable generally to the control of flow of fluids in conduits. The structure as shown and described admits, manifestly, of variation in details, and these shall as I intend be available to one who follows the teaching of my patent, without departing from the spirit of my invention, which I define in the following claims.

Having now described the valve of my invention and indicated what its applicability is, I wish to note certain of its characteristics: (1) it is a valve so arranged within its chamber that, once raised from its seat, it may be shifted with relative ease; (2) it is always positively controlled in its movement, and may not be jammed to its seat and injured by pressure of the fluid whose flow it controls; (3) its motion is a right-line motion, there is no turning—indeed, turning of the valve is prevented by the connection through which it is driven,—there is accordingly no grinding of valve and seat one on the other, but exact meeting of surfaces minutely shaped the one to the other; (4) valve and valve seat being made both of the same metal, neither will cut or deform the other; (5) the drum 10, slot 9, and the degree of eccentricity of pin 13 may be so proportioned that when the valve has come fully and squarely to its seat, any further force applied through the stem 11 otherwise tending to crowd the valve upon its seat, will be borne by the engagement of the external surface of drum 10 upon the end of recess 9. The consequence and effect of this is that valve and valve seat are protected against mutilation. I find that in the use of this valve I can shut off the flow of such light gases as hydrogen and butane, and that the valve will in prolonged use continue to be effective for such exacting service. That is a capacity which this valve alone possesses, so far as my experience goes. This advantageous utility I attribute to two characteristic features of my valve: one, that the meeting surfaces of valve and seat, instead of being torn by cutting tools, (so that minutely examined the edges of the orifice when the valve opens are ragged) may be made compact and dense under blows of forming tools; the second characteristic is that the valve does not screw open but lifts open, and comes clear away from the seat at every point. By virtue of these characteristics the valve is not liable to be clogged by frost—a common difficulty with valves used to control the flow of light gases from containers in which they are held under high pressure.

I claim as my invention:

1. In a valve structure the combination of a chamber with an orifice in its wall, a valve adapted to be shifted in right-line movement toward and from said orifice, the body of said valve being provided with a lateral recess, a rotatable stem extending transversely of the direction of valve movement into said recess in the valve body, connection between stem and valve eccentric with relation to the axis of stem rotation, the parts being so proportioned and arranged that abutment of the body of the moving valve against the body of the rotating stem limits the movement of the valve in direction toward said orifice.

2. In a valve structure the combination of a chamber with an orifice in its wall, a valve adapted to be shifted in right-line movement toward and from said orifice, the body of said valve being provided with a lateral recess, a rotatable stem extending transversely of the direction of valve movement into said recess in the valve body, connection between stem and valve eccentric with relation to the axis of stem rotation, the parts being so proportioned and arranged that abutment of the body of the moving valve against the body of the rotating stem limits the movement of the valve both in its opening and in its closing movements.

3. In a valve structure, the combination of a valve body adapted to be shifted in right-line movement, means for shifting the valve within a predetermined range said shifting means constituting a means for preventing the shifting of the valve beyond a predetermined limit, and additional and adjustable means for still further limiting the range of valve movement, within the range defined by the means first described.

In testimony whereof I have hereunto set my hand.

JAMES B. ANDERSON.

Witnesses:
BAYARD H. CHRISTY,
FRANCIS J. TOMASSON.